(12) United States Patent
Luketic et al.

(10) Patent No.: US 9,969,009 B2
(45) Date of Patent: May 15, 2018

(54) METHOD FOR PRODUCING CONTOURED HOLES

(71) Applicant: ANSALDO ENERGIA IP UK LIMITED, London (GB)

(72) Inventors: Ivan Luketic, Untersiggenthal (CH); Ioannis Paralikas, Ennetbaden (CH); Brian Kenneth Wardle, Brugg-Lauffohr (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 89 days.

(21) Appl. No.: 14/987,875

(22) Filed: Jan. 5, 2016

(65) Prior Publication Data

US 2016/0193667 A1 Jul. 7, 2016

(30) Foreign Application Priority Data

Jan. 6, 2015 (EP) .................... 15150220

(51) Int. Cl.
*B23P 15/02* (2006.01)
*B23P 15/04* (2006.01)
*F01D 5/18* (2006.01)
*B23B 35/00* (2006.01)
*F01D 9/04* (2006.01)
(Continued)

(52) U.S. Cl.
CPC .............. *B23B 35/00* (2013.01); *B23P 15/02* (2013.01); *B23P 15/04* (2013.01); *F01D 5/186* (2013.01); *F01D 9/041* (2013.01); *F01D 25/12* (2013.01); *F01D 25/14* (2013.01); *F23R 3/002* (2013.01); *B23B 2215/76* (2013.01); *B23B 2220/32* (2013.01); *F05D 2220/32* (2013.01); *F05D 2230/10* (2013.01); *F05D 2240/12* (2013.01); *F05D 2240/30* (2013.01);
(Continued)

(58) Field of Classification Search
CPC .......... F01D 5/186; F01D 5/187; F01D 25/12; F01D 25/14; F23R 3/002; B23B 2220/32; F05D 2230/10; F05D 2240/81; F05D 2260/202; Y10T 29/4341; B23P 15/02; B23P 15/04
See application file for complete search history.

(56) References Cited

U.S. PATENT DOCUMENTS 6,092,982 A   7/2000   Ikeda et al.
6,176,676 B1  1/2001   Ikeda et al.
(Continued)

FOREIGN PATENT DOCUMENTS

WO   WO 2013/165509 A2   11/2013

OTHER PUBLICATIONS

European Search Report dated Jul. 7, 2015.

*Primary Examiner* — Jermie Cozart
(74) *Attorney, Agent, or Firm* — Buchanan Ingersoll & Rooney PC

(57) ABSTRACT

A method for manufacturing a contoured hole, the hole being manufactured in a wall, the wall comprising a first, a second surface, and a wall thickness between the wall first and second surface. The comprises manufacturing a first non-penetrating hole extending from the first surface and into the wall, wherein a distal end of the first hole is located within the wall such that the first hole does not penetrate the wall second surface, and manufacturing a through hole, wherein the through hole is fluidly connected with first hole and penetrates the wall second surface.

20 Claims, 19 Drawing Sheets

(51) Int. Cl.
*F01D 25/14* (2006.01)
*F01D 25/12* (2006.01)
*F23R 3/00* (2006.01)

(52) U.S. Cl.
CPC .... *F05D 2240/81* (2013.01); *F05D 2260/202* (2013.01); *Y10T 29/49341* (2015.01)

(56) References Cited

U.S. PATENT DOCUMENTS

| | | | |
|---|---|---|---|
| 7,992,272 B2* | 8/2011 | Janssen | B23C 3/00 219/69.17 |
| 2007/0025852 A1* | 2/2007 | Camhi | B23H 1/04 416/97 R |
| 2011/0293423 A1* | 12/2011 | Bunker | F01D 5/186 416/95 |
| 2013/0209269 A1* | 8/2013 | Gleiner | F01D 5/187 416/97 R |
| 2014/0219815 A1 | 8/2014 | Kohli et al. | |

* cited by examiner

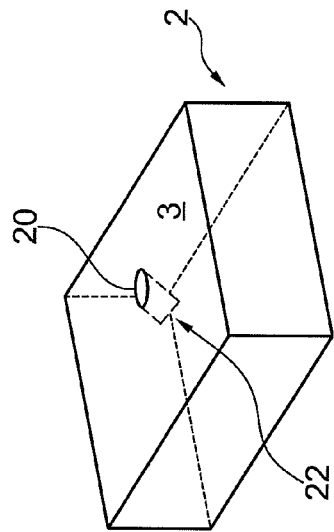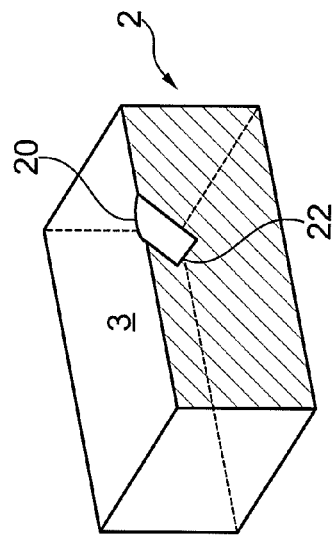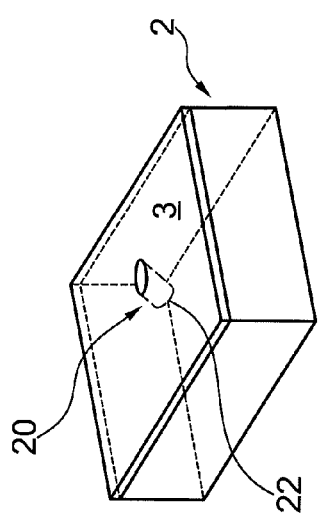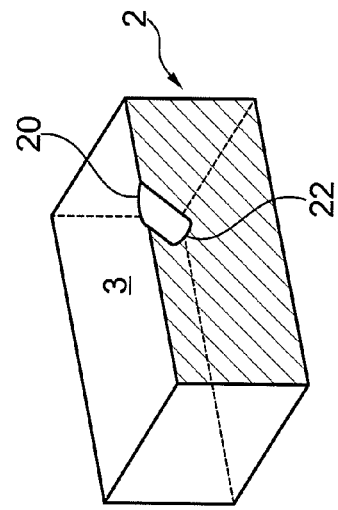
Fig. 15
Fig. 16

METHOD FOR PRODUCING CONTOURED HOLES

TECHNICAL FIELD OF INVENTION

The present disclosure relates to the field of producing contoured holes as disclosed.

Such holes may be applied as film cooling holes e.g. in gas turbines, such as for instance on expansion turbine blades or vanes.

BACKGROUND OF INVENTION

In cooling thermally highly loaded components of gas turbine engines often film cooling is applied. For film cooling, cooling fluid is guided onto a thermally loaded surface of a gas turbine component, such as for instance a blade, a vane, or a platform, and is intended to flow along this surface. Consequently, film cooling holes need to be inclined and diffuser shaped in order to provide a coolant layer directed along the component surface and to avoid separation of the coolant flow from the component surface.

It is known to produce such cooling holes e.g. by means of electrochemical methods or laser drilling. While the first production method is time consuming and expensive, laser drilling may result in significant heat intake which may have an impact on the metallurgical quality, and also in backstrikes on an opposite wall of e.g. a hollow blade or vane.

Likewise, drilling through thermal barrier coatings and a required dimensional accuracy as well as airflow capability may be an issue in manufacturing cooling holes.

SUMMARY OF THE INVENTION

It is an object of the present disclosure to provide a method for manufacturing contoured holes. In an aspect of the disclosure a method shall be provided avoiding the drawbacks of the art. In a further aspect, a method shall be provided which allows a fast and inexpensive method of producing contoured holes. In still a further object of the disclosure, a method is provided for manufacturing cooling holes, in particular cooling holes for gas turbine components, and in particular film cooling holes. In a more specific aspect, such holes shall be manufactured, for instance, in blades, vanes, or platforms. A possible intended use of the holes as film cooling holes requires specific boundary conditions to be met, such as for instance inclining the holes into an intended hot gas flow direction, or shaping them as diffusors, such that the cooling air emanating on the hot gas side will flow as tangentially as possible over the surface to be cooled, and the cooling air flow does not interfere with the hot gas flow.

This is achieved by the method as disclosed herein.

Accordingly, a method for manufacturing a contoured hole is disclosed, the hole being manufactured in a wall, the wall comprising a first surface and a second surface, wherein the method comprises manufacturing a first non-penetrating hole extending from the first surface and into the wall, wherein a distal end of the first hole is located within the wall such that the first hole does not penetrate the wall second surface, and manufacturing a through hole, wherein the through hole is fluidly connected with first hole and penetrates the wall second surface.

The holes being fluidly connected with each other is to be understood as that a fluid directed into one of the holes would be able to flow into the other hole. In exemplary embodiments this means that the holes comprise a junction with each other. It may likewise be possible that the holes are indirectly connected, as will be lined out below.

The holes may have circular cross sections, and may be, in more specific modes of applying the teaching of the present disclosure, cylindrical holes, and even more specifically cylindrical bores.

A non-penetrating hole may in certain aspects of the present disclosure be characterized as a blind hole; however, as will become more apparent, in certain embodiments a non-penetrating hole will have a distal end located in another hole and may thus strictly speaking be considered not to be a blind hole. However, it will not penetrate the wall from the first to the second surface.

It shall be noted that it is not mandatory to manufacture the first non-penetrating hole before manufacturing the through hole. The order in which the holes are manufactured may be chosen in any appropriate manner. However, as will be lined out in more detail below, manufacturing a non-penetrating hole before manufacturing the through hole may be found advantageously in certain embodiments.

It is further noted that within this disclosure the term "distal" is used. A distal end of a hole shall designate the end of a hole which is formed at the tip of a tool used for manufacturing said hole.

Manufacturing a hole may comprise at least one drilling step, and may in particular comprise peck drilling.

In certain aspects of a method according to the present disclosure, the method may comprise manufacturing the first hole with a first cross sectional area, manufacturing the through hole with a through hole cross sectional area, and choosing the through hole cross sectional area smaller than the first cross sectional area. In the context of a cooling hole the through hole may then provide a metering hole, wherein the through hole cross sectional area restricts a coolant mass or volume flow through the cooling hole.

In still a further aspect of a method according to the present disclosure the method may comprise manufacturing a second non-penetrating hole, the second hole being fluidly connected with the first hole and the through hole, and comprising a second hole distal end located within the wall such that the second hole does not penetrate the second wall surface. In certain embodiments the second non-penetrating hole may be manufactured to be directly fluidly connected, i.e. have a junction, with each of the first non-penetrating holes and the through hole, and thus to provide an indirect fluid connection between the through hole and the first non-penetrating hole. Likewise, for instance, the first non-penetrating hole may be manufactured to provide an indirect fluid connection between the through hole and the second non-penetrating hole.

Again, it shall be noted that it is not mandatory to manufacture the first non-penetrating hole before manufacturing the second non-penetrating hole. For instance, modes of the method are conceivable wherein the method is carried out in one of the following orders: firstly manufacturing the first non-penetrating hole, then manufacturing the second non-penetrating hole, and subsequently manufacturing the through hole; or firstly manufacturing the through hole, then manufacturing the first non-penetrating hole, and subsequently producing the second non-penetrating hole.

Other orders of manufacturing may be conceivable.

In certain modes of applying the teaching of the present disclosure the method may comprise manufacturing the first hole with a first cross sectional area, manufacturing the second hole with a second hole cross sectional area, and manufacturing the through hole with a through hole cross sectional area which is smaller than at least one of the first and second cross sectional areas. In particular, the through hole cross sectional area may be smaller than both the first and the second cross sectional areas. In more specific modes of applying the teaching of the present disclosure the through hole cross sectional area may be manufactured smaller than the second cross sectional area and the second cross sectional area may be manufactured smaller than the first cross sectional area. It is understood that consequently in a mode in which the holes have circular cross sections and more specifically are cylindrical bores, the through hole diameter is smaller than at least one of the first and second diameters. In particular the through hole diameter may be smaller than both the first and the second hole diameters. In yet more specific modes the through hole diameter may be smaller than the second hole diameter and the second hole diameter may be smaller than the first hole diameter.

In a further aspect, a mode of carrying out the method according to the present disclosure, manufacturing the first hole comprises penetrating the first surface at a first entry location and forming a first entry opening, and advancing a tool into the wall along a first hole axis, stopping tool advancement before reaching the wall second surface, thus producing a first hole distal end. Manufacturing the second hole comprises penetrating the first surface at a second entry location and forming a second entry opening, and advancing a tool into the wall along a second hole axis, and stopping tool advancement before reaching the wall second surface, thus producing a second hole distal end. Manufacturing the through hole comprises penetrating the first surface at a through hole entry location different from the first and second entry locations and forming a through hole entry opening, advancing a tool into the wall along a through hole axis, and continuing tool advancement until the wall second surface is penetrated thus producing the through hole. It further comprises choosing the first, second and through hole axis such that each hole intersects with at least one other hole, whereby the holes are fluidly connected with each other, and wherein in particular all three holes intersect at a common intersection location, and wherein further in particular the through hole intersects the first and second holes at a common first and second hole distal end. In other words, in this mode of applying the teaching of the present disclosure the method comprises producing each hole at a different location of the wall first surface, and manufacturing the holes such that each hole meets at least one other hole inside the wall. Consequently, each hole is fluidly connected with each other. In more specific modes, the holes are manufactured such that all holes meet at a common intersection point, thus being directly fluidly connected with each other. In a still more specific mode of carrying out the method the common intersection point is chosen to be identical with the end point or distal end of each of the non-penetrating holes, that is, the first and the second hole.

In yet more specific embodiments the through hole axis is chosen such as to include a main tilt angle with the wall first surface normal at the through hole entry location and defining a main plane spanned up by the through hole axis and the wall first surface normal at the through hole entry location. The first and second hole axes are chosen such as to include first and second tilt angles with the wall first surface normal at the respective entry locations. The first and second hole axis, when projected onto the main plane, include first and second projected tilt angles with the surface normal at the through hole entry location. Said respective first and second axes are chosen such that the respective projected tilt angles are larger than the main tilt angle. In other words, the through hole defines a main inclination direction, and the first and second holes are stronger inclined into said inclination direction than the through hole.

The through hole axis may be chosen such as to include a main tilt angle with the wall first surface normal at the through hole entry location and defining a main plane spanned up by the through hole axis and the wall first surface normal at the through hole entry location. The first and second hole entry locations may be chosen such as to be laterally offset from said main plane, and in particular be chosen such that the first and second hole entry locations are arranged on different sides of the main plane. In particular a symmetric arrangement may be chosen wherein the first and second hole entry locations are arranged at a same distance from the through hole entry location and a same distance from the main plane, or, along and transverse to a through hole inclination direction.

Moreover, the method may comprise arranging the first and second entry openings in a non-overlapping manner, and may in particular comprise arranging the first, second and through hole entry openings such that each entry opening is non-overlapping with each other entry opening.

In still a further mode of carrying out a method according the present disclosure it may further comprise removing material between the first and second hole and the through hole, wherein removing the material in particular comprises applying a chip removing machining process and more particular a milling process. It may comprise applying a high speed cutting process. This may further comprise shaping at least one of a contoured geometry of a contoured hole entry opening at the wall first surface and a contoured hole longitudinal section. The shaping step may in particular comprise applying a chip removing machining process and more particular a milling process, or a high speed cutting process.

In another mode of applying the teaching of the present disclosure, at least one of the through hole axis and a second hole axis are chosen to be laterally offset from and at least essentially parallel to the first hole axis. This may comprise choosing the hole cross sections and axes offsets such that, in an axial view, all hole perimeters are contained in a perimeter defined by one of the hole perimeters. In a more specific mode it may comprise choosing a second hole axis to be laterally offset from and at least essentially parallel to the first hole axis and choosing the through hole axis to be laterally offset from and at least essentially parallel to the second hole axis. It may further comprise choosing the second hole axis to be laterally offset from the first hole axis by a first offset, choosing the through hole axis to be laterally offset from the second hole axis by a second offset, and choosing the first offset and the second offset to be at least essentially aligned with each other.

The axes offset may be chosen dependent on the hole cross sections such that the hole perimeters are tangent with each other.

It will be appreciated that, if the holes have different cross sections, and the hole perimeters are included within each other, a contoured hole with a stepped longitudinal section will result. The method may then further comprise smoothening the transitions between the hole perimeters thus producing a fan-shaped hole with a continuous inner surface. The smoothening step may include a chip removing process, and may comprise a milling process. It may comprise applying a high speed cutting process.

Manufacturing a hole may in certain modes of applying the teaching of the present disclosure comprise drilling and may in particular comprise peck drilling.

In specific modes of carrying out the method as disclosed herein it may comprise drilling a first blind hole, flattening the distal end of the first blind hole, and drilling a through hole from the bottom or distal end of the first blind hole. This comprises choosing a through hole diameter smaller than the first hole diameter. It may comprise arranging a through hole axis parallel to and offset from a first hole axis, and may further comprise arranging the offset such that the through hole perimeter is tangent to the first hole perimeter. It may further comprise subsequently smoothening the stepped transition between the first hole and the through hole.

The smoothening step may comprise applying a chip removing process, such as for instance milling, and/or a high speed cutting process.

It may be conceivable to change the order of producing the first hole and the through hole.

In further specific modes of carrying out the method as disclosed herein it may comprise drilling a first blind hole with a first depth, drilling a second blind hole with a second depth, wherein the second depth is larger than the first depth, each depth measured from the first surface of the wall, and drilling a through hole. In particular a through hole diameter may be chosen smaller than a second hole diameter and a second hole diameter may be chosen smaller than a first hole diameter. In particular the hole axes may be offset to each other. More in particular, the offsets may be chosen such that the through hole perimeter is located within the second hole perimeter and the second hole perimeter is located within the first hole perimeter. The offsets may further be chosen such that the through hole perimeter is tangent with the second hole perimeter, and/or the second hole perimeter is tangent with the first hole perimeter. The offsets may further be chosen such that the through hole perimeter, the second hole perimeter and the first hole perimeter are tangent with each other at a common tangent point when seen in an axial view.

Said modes of applying the teaching of the present disclosure may further comprise drilling a first blind hole, flattening the distal end or bottom of the first blind hole, drilling a second blind hole from the distal end of the first blind hole, flattening the distal end or bottom of the second blind hole, and drilling a through hole from the bottom or distal end of the second blind hole. Said modes may comprise drilling the holes with offset axes, wherein the offsets may be at least essentially aligned with each other, and/or may be chosen such that the hole perimeters are tangent to each other. It may further comprise subsequently smoothening the stepped transition between the first hole, the second hole, and the through hole. The smoothening step may comprise applying a chip removing process, such as for instance milling.

It may be conceivable to change the order of producing the first, the second, and the through hole.

In still a further embodiment within the teaching of the present disclosure a first blind hole is drilled starting at a first entry location on the first surface of the wall. A second blind hole is drilled starting at a second entry location on the first surface of the first wall surface, the second hole axis arranged such that the second hole meets the bottom or distal end of the first blind hole. In particular, the second blind hole depth is chosen such that the bottom or distal end of the second blind hole is congruent with the bottom or distal end of the first blind hole, thus producing a V-shaped hole geometry within the wall. A through hole penetrating the wall from the wall first surface to the wall second surface is drilled, starting at a through hole entry location, and the through hole axis is chosen such that the through hole meets the tip of the V-shaped hole. Subsequently, residual material between the first, second and through hole is removed, in particular by a chip removing process, such as for instance milling. Further material may be removed by said removal process such as to shape a fan-shaped hole.

It is understood that all holes drilled in the above-described methods may be inclined on the wall, such that inclined film cooling holes are produced in the wall.

It is further understood that the method may be applied at different locations on the wall such as to produce a multitude of cooling holes, and in particular film cooling holes.

The following statements may apply to the method as disclosed herein in general, i.e. to all methods as claimed in claim 1 and to all modes of applying the teaching of the present disclosure disclosed above or otherwise disclosed herein:

A thermal barrier coating may be present on the wall first surface. The method may then comprise locally removing the thermal barrier coating at least at an entry point of a hole on the wall first surface before manufacturing a hole.

The method according to the present disclosure may be applied to manufacture cooling holes, in more in particular film cooling holes, in a wall of a thermally loaded component, in particular thermally loaded gas turbine components. These may be, for instance, but not limited to, vanes, platforms, heat shields, or combustor elements. These components are intended for use e.g. in the hot gas path of a gas turbine engine, with a hot gas flow flowing over the wall first surface when in operation. An intended hot gas flow direction is defined on the wall first surface. In applying the method disclosed herein for manufacturing film cooling holes, it may be preferred if the film cooling holes are shaped and arranged such that a layer of cooling air, introduced at the wall second surface, flowing through the cooling hole and discharged at the wall first surface, has a flow component directed along the component surface and into the intended hot gas flow direction. In an advantageous mode of applying the teaching of the present disclosure the axis of at least one of the holes is inclined against a normal on the wall first surface an into the intended hot gas flow direction. It may thus be found beneficial if at least one hole axis, in particular the through hole axis, is chosen such as to include a tilt angle with the wall first surface normal at a hole entry location and defining a main plane spanned up by the hole axis and the wall first surface normal at the hole entry location. Said angle tilt angle may be chosen 30° or larger, in particular 45° or larger, more particular 60° or larger, with the tilt angle oriented such that said axis is inclined into the intended hot gas flow direction. Further, the axis may be chosen such that an angle between the main plane and the intended hot gas flow direction is 30° or less, and in particular such that said main plane is at least essentially parallel to the intended hot gas flow direction.

It may further be preferred if the cooling hole cross section widens from the wall second surface to the wall first surface thus forming a diffuser for a coolant flow from the wall second surface to the wall first surface. This will serve to reduce the velocity of the coolant emanating from the cooling hole and reduce interferences with the hot gas flow. The through hole then forms the smallest cross section and serves as a metering hole, determining the coolant mass or volume flow for a given pressure ratio between the wall first and second surface.

The features of the modes of applying the teaching disclosed above may be combined with each other. Various objects and beneficial effects of the disclosed teaching, whether explicitly mentioned or not, may become readily apparent to the skilled person.

BRIEF DESCRIPTION OF THE DRAWINGS

The subject matter according to the present disclosure is now to be explained more closely by means of different embodiments and with reference to the attached drawings. The figures of the drawings show FIG. 1 an airfoil with a film cooling hole;

FIGS. 15-20 a method for manufacturing the holes of FIG. 14;

The figures are schematic, and details not required for understanding of the disclosure have been omitted.

DETAILED DESCRIPTION OF DIFFERENT EMBODIMENTS OF THE INVENTION

The method as described above will now be lined out in more detail on the basis of some exemplary embodiments.

Figure 1:
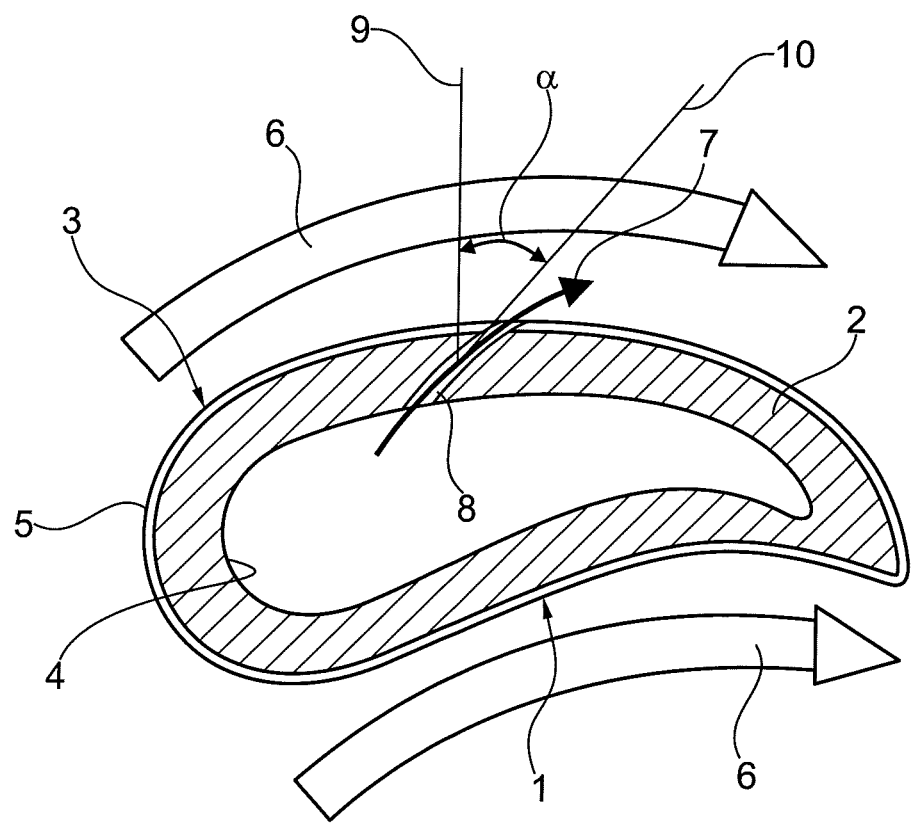

FIG. 1 depicts schematically a cross section through a cooled airfoil as an example of a thermally loaded component. The cooled airfoil 1 comprises a wall 2. The wall 2 comprises a first surface 3 and a second surface 4. Furthermore, a thermal barrier coating 5 is provided on the first surface 3. A hot gas flow is intended to flow along airfoil 1, in the direction denoted by arrows 6. In order to cool the airfoil, the wall 2 is provided with cooling holes, of which one is exemplarily shown. Cooling hole 8 extends between the wall first and second surface. It is fan-shaped, with the cross section increasing from the second surface 4 to the first surface 3. Thus, a coolant flow 7 is decelerated while flowing through the cooling air hole 8. Further, a cooling hole axis 10 is tilted against a surface normal 9 at the cooling hole entry location on the first surface. The cooling hole axis is tilted by an angle a, and is tilted in the intended direction of the hot gas flow.

While the example of an airfoil has been provided, the skilled person will readily appreciate the arrangement of cooling hole 8 on other components, such as, but not limited to, platforms, heat shields, or combustor parts.

Figure 2:
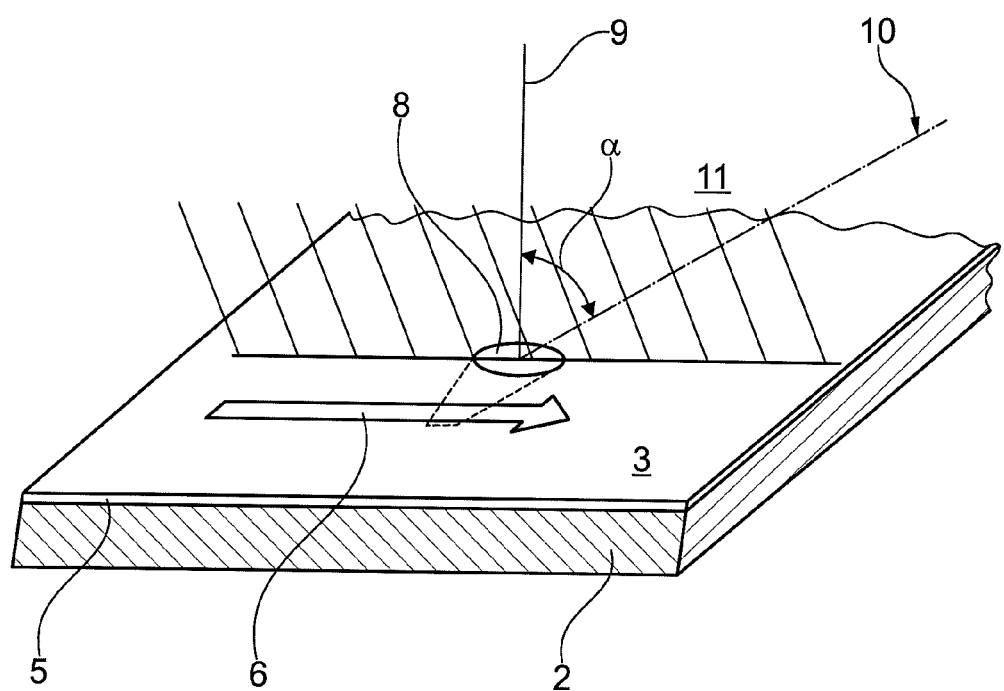
FIG. 2 a schematic illustration of a component wall with a film cooling hole.

FIG. 2 depicts a schematic view of a wall 2 with a cooling hole 8. The wall 2 is provided with a thermal barrier coating 5 on the wall first surface 3. A hot gas flow 6 is intended to flow over the wall first surface 3. Cooling hole 8 penetrates the wall first surface 3 at an entry location. A surface normal at the entry location is denoted as 9. The cooling hole has a cooling hole axis 10, which it is inclined against the surface normal 9 by an angle a. Cooling hole axis 10 and surface normal 9 span up a plane 11. That means, surface normal 9 and cooling hole axis 10 are arranged in plane 11. Plane 11 is arranged parallel with the intended hot gas flow direction 6. The plane orientation on the wall surface is defined by the orientation of the cooling hole axis 10. Furthermore, the tilt angle of the cooling hole axis is oriented such that it points into the intended hot gas flow direction. Thus, a cooling air flow emanating from cooling hole 8 would have a velocity component into the intended hot gas flow direction, and would thus flow smoothly along the wall first surface 3. It will be appreciated that certain deviations of the plane orientation and the intended hot gas flow direction might be acceptable, such that they may include angles of up to e.g. 30°. It will however be understood that smaller angles will be preferred, and to arrange cooling hole axis such that plane 11 is reasonably parallel to the intended hot gas flow direction should be strived for.

Figure 3:
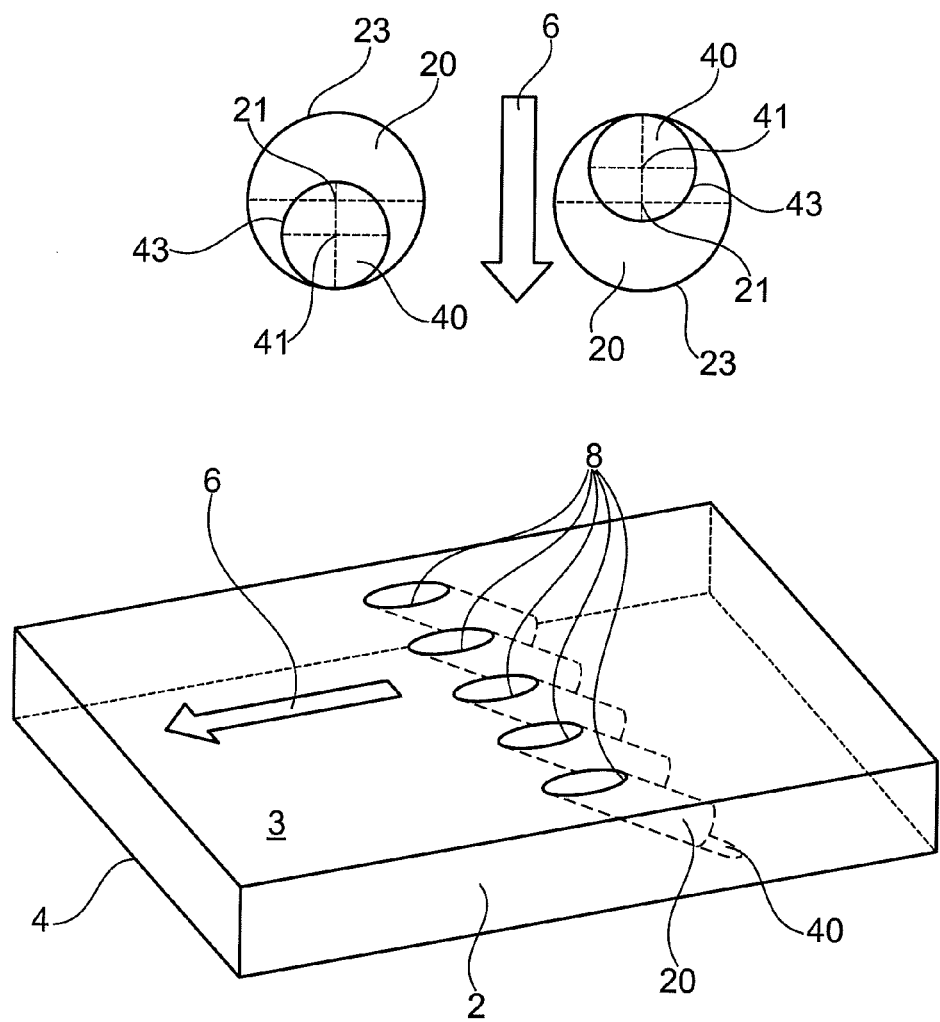
FIG. 3 a wall with first embodiments of film cooling holes with stepped cross sectional transitions.

A first embodiment of cooling holes is shown in FIG. 3. In the lower part of FIG. 3, a wall 2 is shown with a number of cooling holes 8 having a step-cylindrical geometry extending between a wall first surface 3 and second surface 4. The cooling holes are tilted in the intended hot gas flow direction 6. The cooling holes comprise a first non-penetrating hole 20 and a through hole 40. Through hole 40 has a smaller diameter than first non-penetrating hole 20. Through hole 40 is thus a metering hole which determines the cooling air mass or volume flow in defining the smallest cross section of a cooling hole 8. In the upper part of FIG. 3, axial views of a cooling hole are shown. The axis 41 of through hole 40 is parallel and offset with respect to the axis 21 of first non-penetrating hole 20. The offset is chosen such that the perimeters 23, 43 of the holes are tangent. Two configurations are shown, in which the through hole axis is offset upstream or downstream the intended hot gas flow direction.

Figure 5:
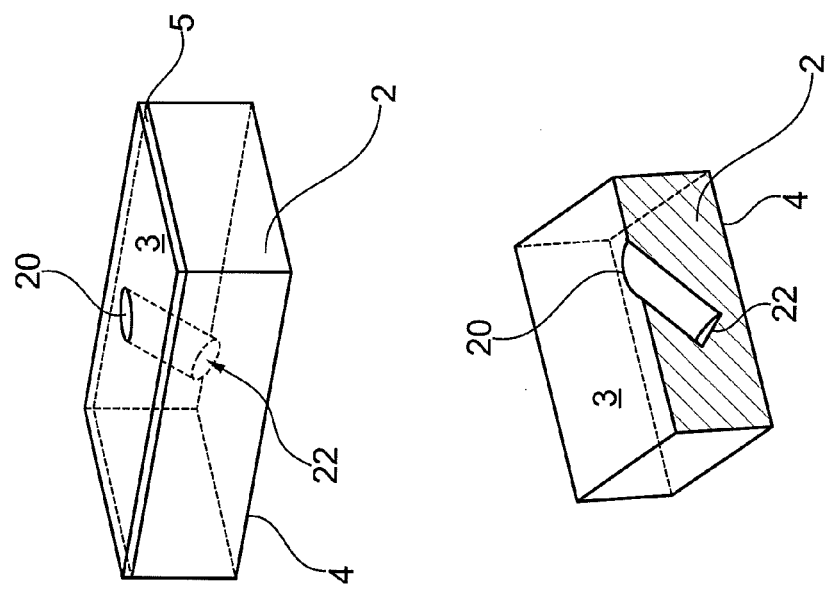
FIGS. 4-7 a method for manufacturing the holes of FIG. 3.
Figure 4:
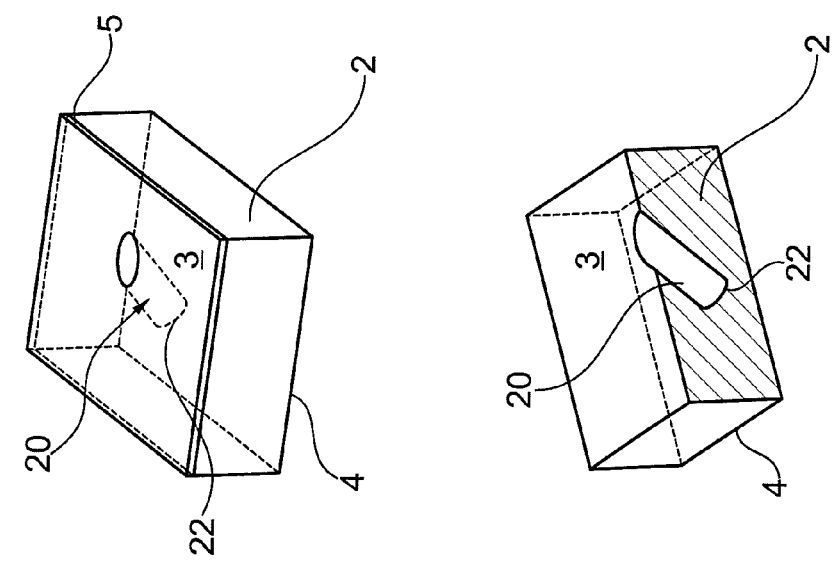
Figure 7:
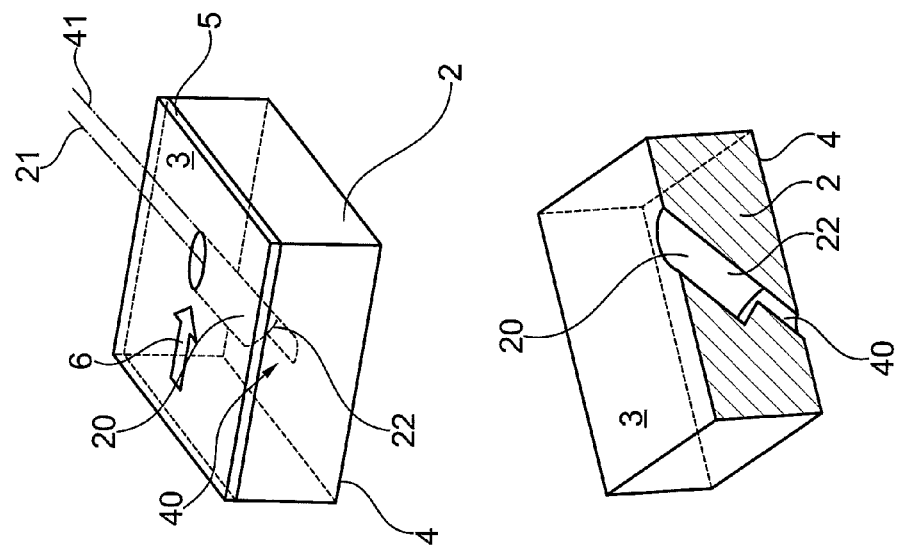
Figure 6:
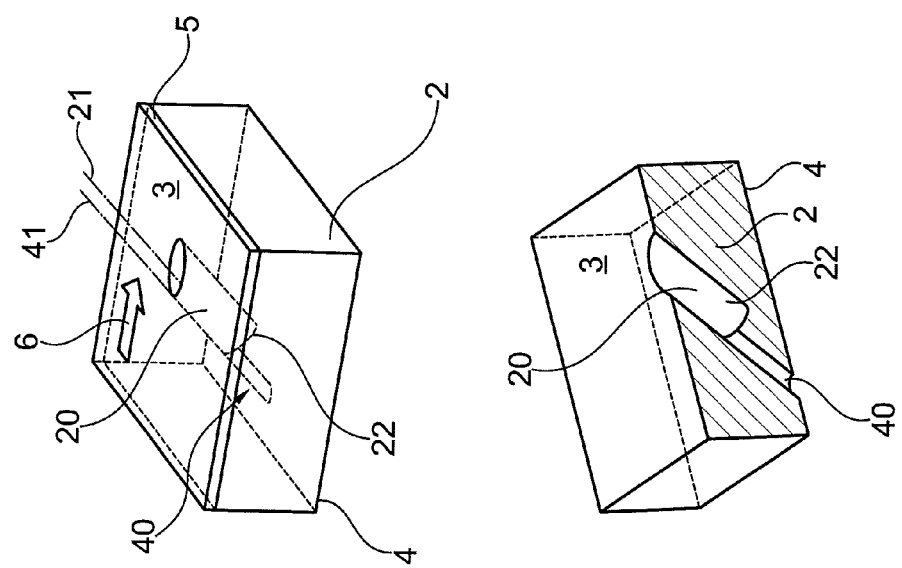

FIGS. 4 through 7 illustrate a method for manufacturing cooling holes 8 of FIG. 3. In a first step, non-penetrating first hole 20 is drilled starting from the wall first surface 3. Before staring drilling, a thermal barrier coating may have been locally removed at the hole entry location. The non-penetrating hole 20 has a distal end 22 located inside the wall. It penetrates the wall first surface 3, but does not penetrate the wall second surface 4 and thus not the wall. After drilling, distal end 22 is pointed, due to the drilling tool geometry. In a next step, the distal end or bottom 22 of non-penetrating blind hole 20 is flattened, as illustrated in FIG. 5. Afterwards, with reference to FIGS. 6 and 7, through hole 40 is drilled starting from the flattened distal end 22 of first hole 20. The axis 41 of the through hole is parallel to and offset from the first hole axis 21. In the embodiment of FIG. 6 the through hole axis 41 is offset from the first hole axis 21 upstream the intended hot gas flow direction 6, while in the embodiment of FIG. 7 the through hole axis 41 is offset from the first hole axis 21 downstream the intended hot gas flow direction 6.

Figure 8:
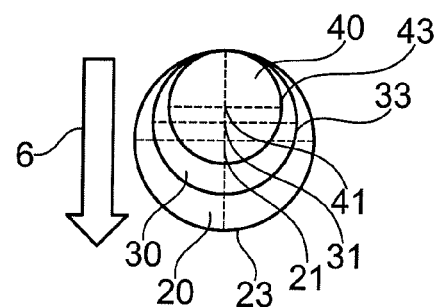
FIG. 8 a wall with second embodiments of film cooling holes with stepped cross sectional transitions.
Figure 8:
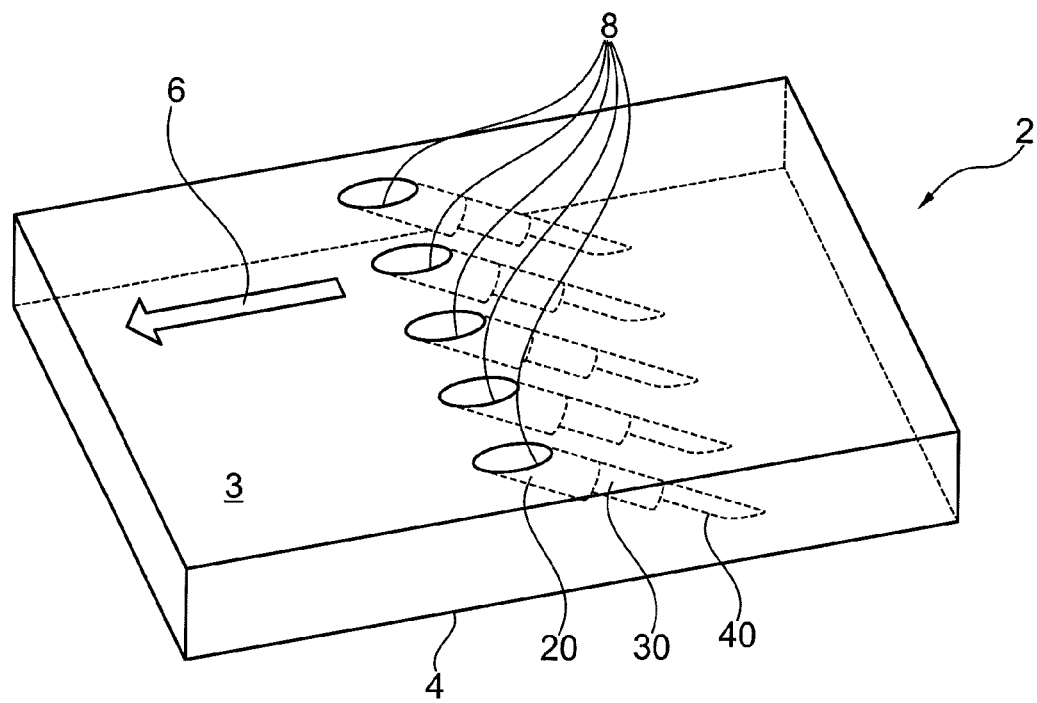

A further embodiment of step-cylindrical cooling holes is shown in FIG. 8. In the lower part of FIG. 8 a wall 2 is shown with a number of cooling holes 8 having a step-cylindrical geometry extending between a wall first surface 3 and second surface 4. The cooling holes are tilted in the intended hot gas flow direction 6, that is, in a downstream direction. The cooling holes comprise a first non-penetrating hole 20, second non-penetrating hole 30, and through hole 40. Second non-penetrating hole 30 has a smaller diameter than first non-penetrating hole 20, while through hole 40 has a smaller diameter than second non-penetrating hole 30. Through hole 40 thus serves as a metering hole which determines the cooling air mass or volume flow in defining the smallest cross section of a cooling hole 8. The larger diameter first and second hole serve to decelerate a coolant flow which is directed from the wall second surface 4 to the wall first surface 3. In the upper part of FIG. 8 an axial view of a cooling hole is shown. The axes 21, 31 and 41 of first and second non-penetrating holes 20 and 30 and the through hole 40 are parallel to and offset from each other. The offsets are chosen such that the perimeters 23, 33, 43 of the holes are tangent. The axis of the second non-penetrating hole is offset from the first non-penetrating hole axis in an upstream direction of an intended hot gas flow 6. The axis of the through hole is offset from the second non-penetrating hole axis in an upstream direction of the intended hot gas flow. The offsets are aligned with each other.

Figure 10:
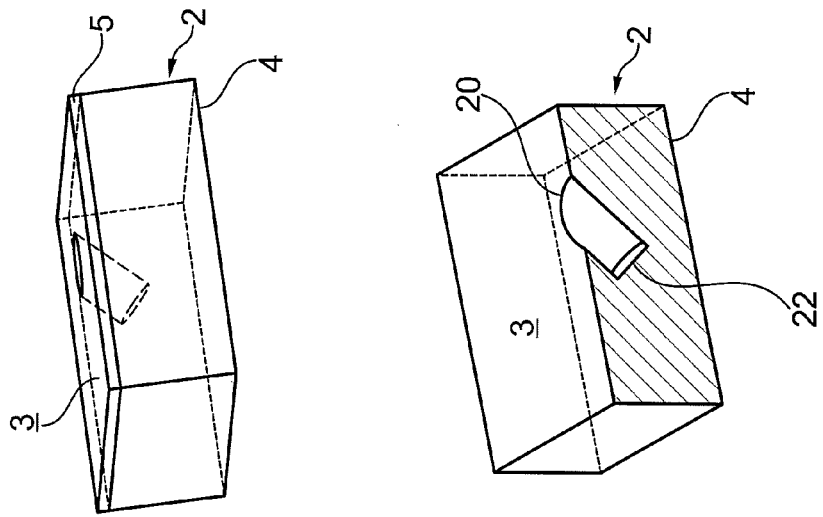
FIGS. 9-13 a method for manufacturing the holes of FIG. 8.
Figure 9:
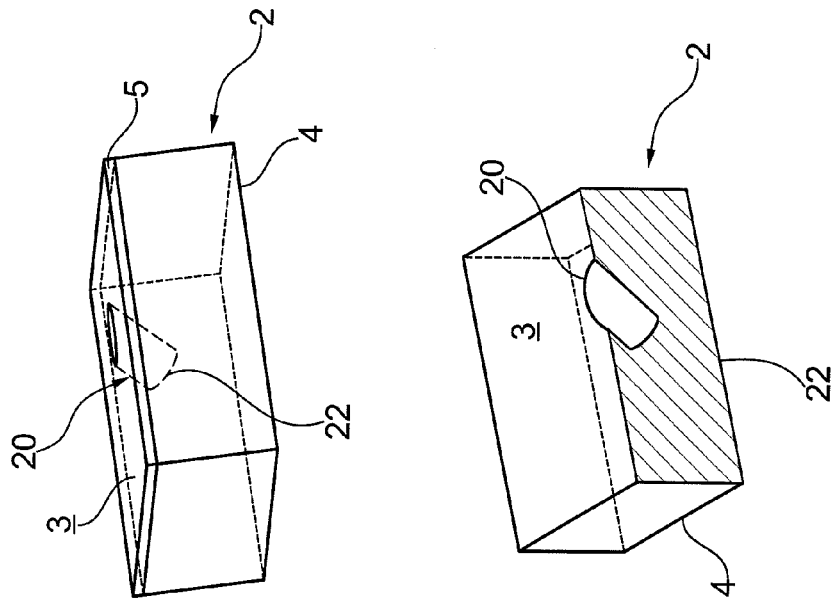
Figure 11:
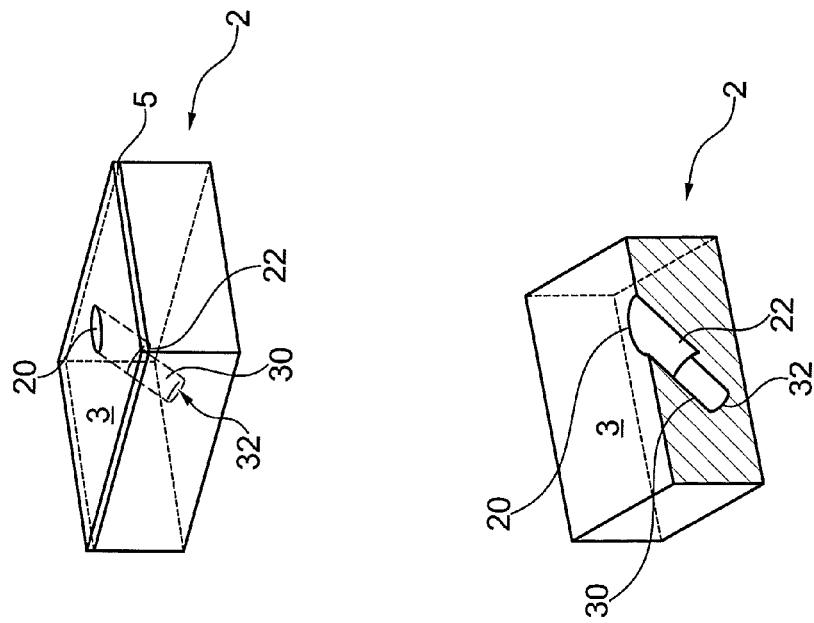
Figure 12:
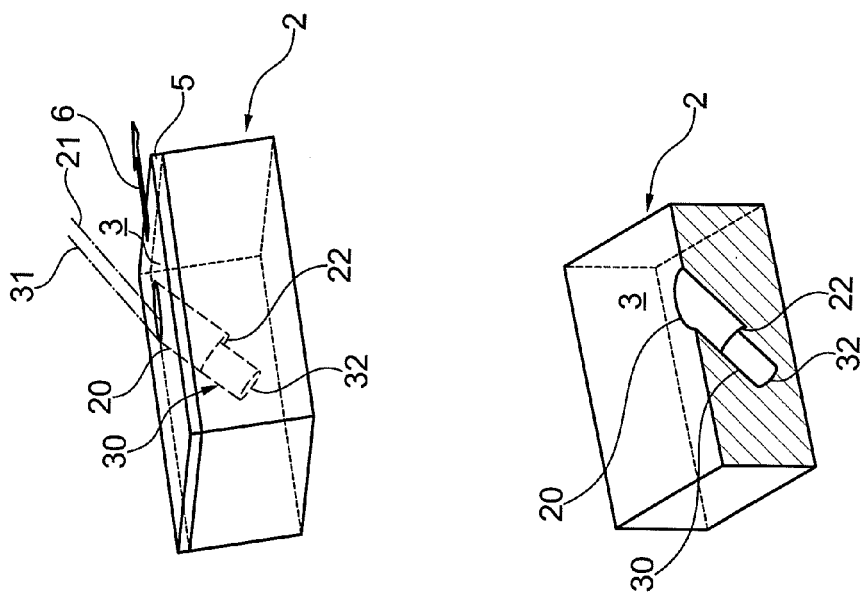
Figure 13:
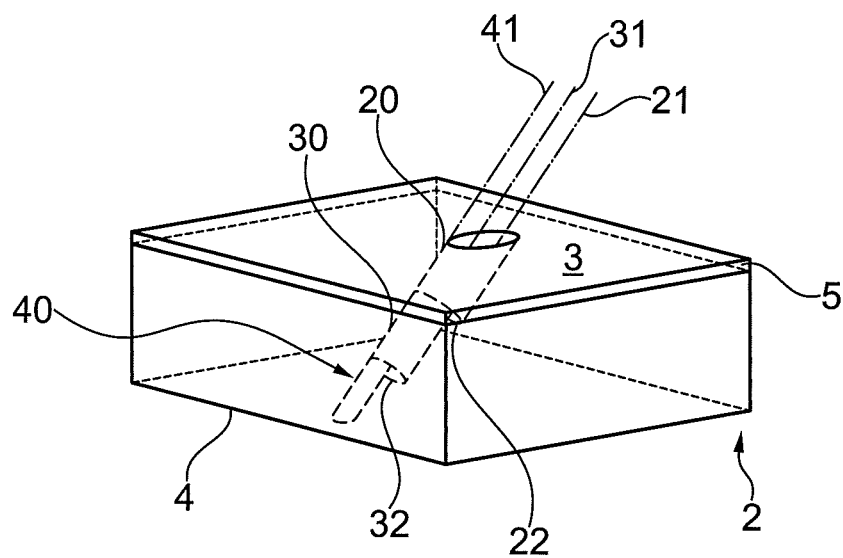
Figure 13:
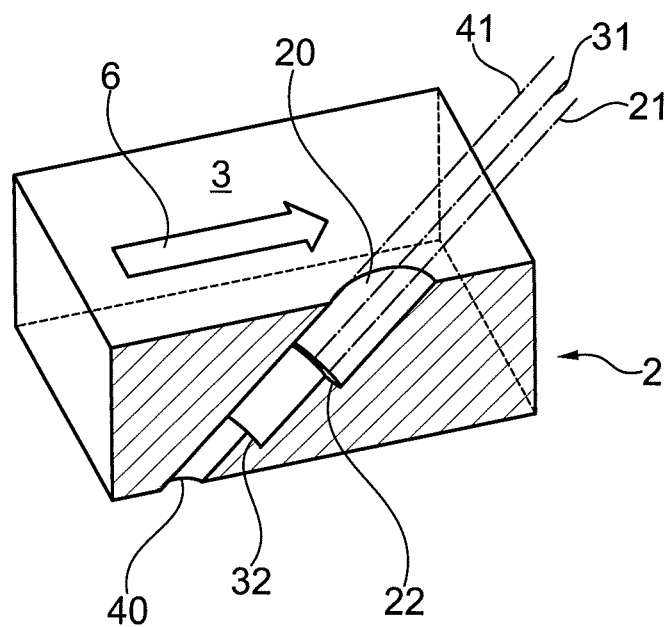

FIGS. 9 through 13 illustrate a method for manufacturing cooling holes 8 of FIG. 8. In a first step, non-penetrating first hole 20 is drilled starting from the wall first surface 3. Before staring drilling, a thermal barrier coating may have been locally removed at the hole entry location. The non-penetrating hole 20 has a distal end 22 located inside the wall. It penetrates the wall first surface 3, but does not penetrate the wall second surface 4. After drilling, distal end 22 is pointed, due to the drilling tool geometry. In a next step, the distal end or bottom of first non-penetrating blind hole 20 is flattened, as illustrated in FIG. 10. With reference to FIG. 11, second non-penetrating hole 30 is subsequently drilled staring at the distal end 22 of first non-penetrating hole 20, with the drill axis offset from and parallel to the first non-penetrating hole axis. After drilling, distal end 32 of second non-penetrating hole 30 is pointed, due to the drilling tool geometry. In a next step, the distal end or bottom of second non-penetrating hole 30 is flattened, as illustrated in FIG. 12. Afterwards, as illustrated in FIG. 13, through hole 40 is drilled starting from the flattened distal end 32 of second hole 30. The axis 41 of the through hole is parallel to and offset from the second hole axis 31 upstream the intended hot gas flow direction.

Figure 14:
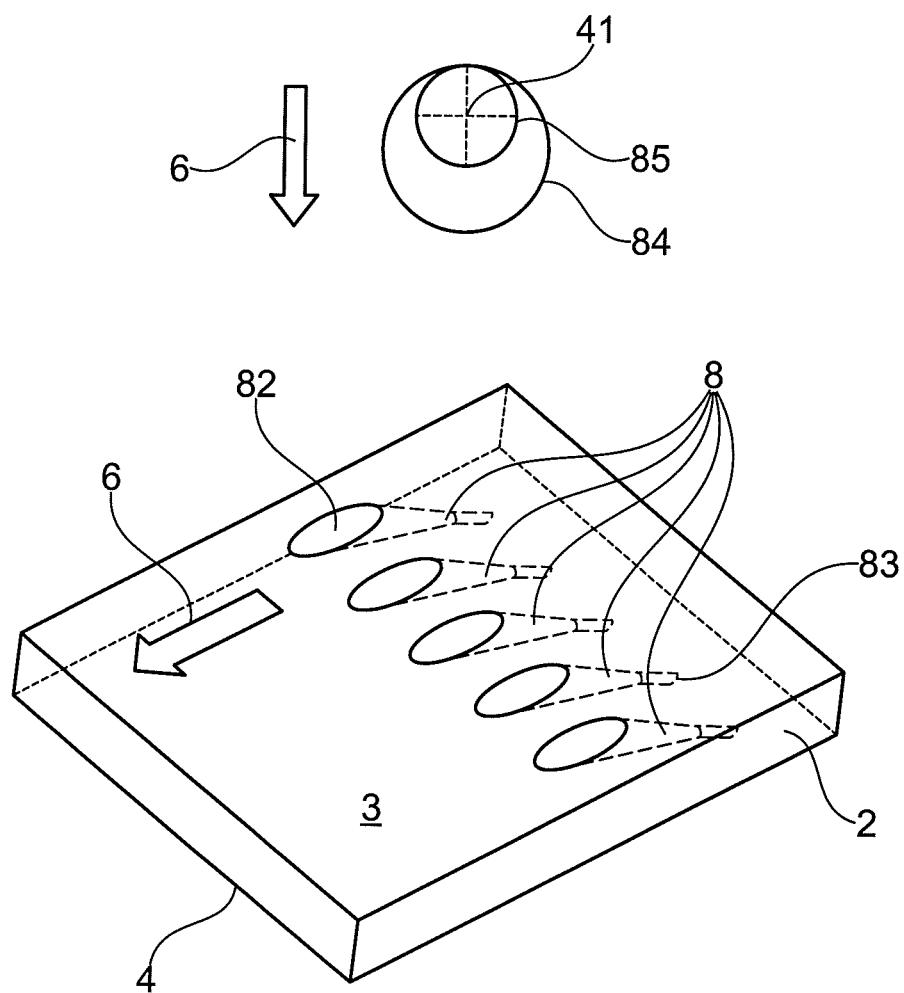
FIG. 14 a wall with film cooling holes comprising a conical section.
Figure 18:
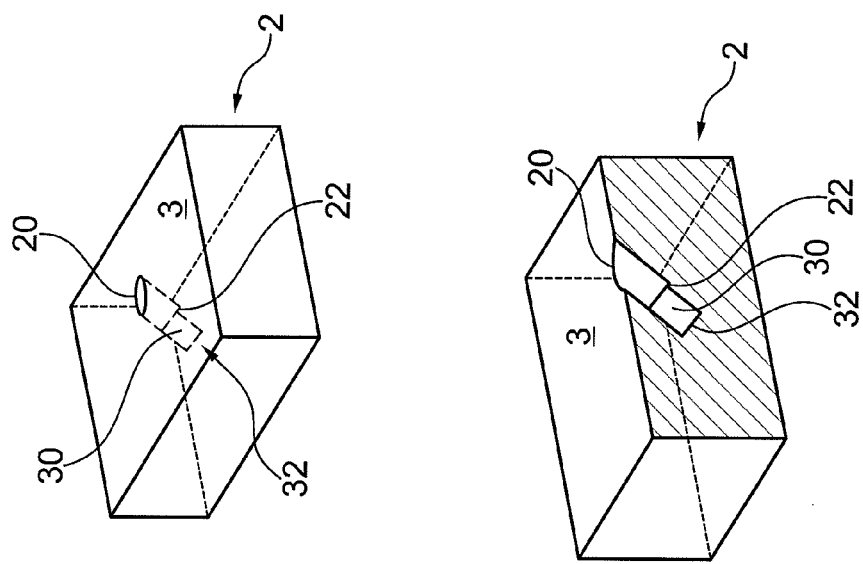
Figure 17:
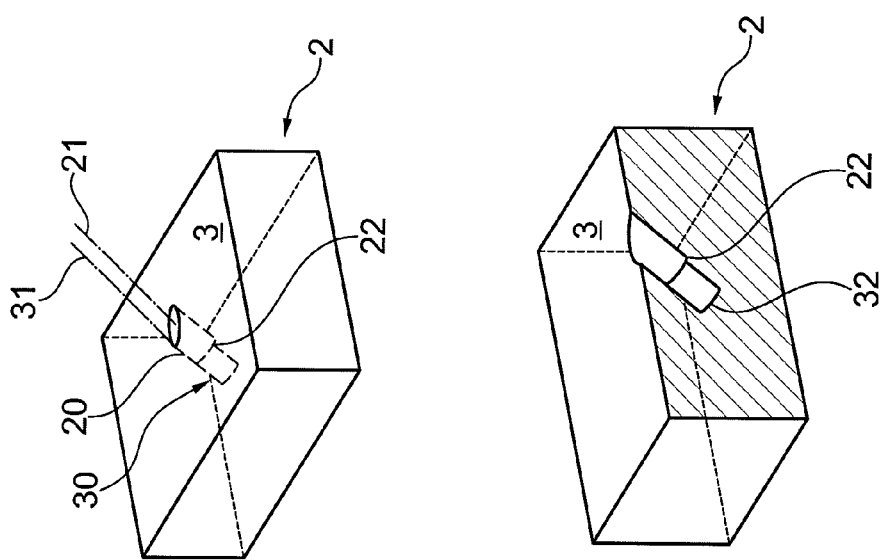
Figure 20:
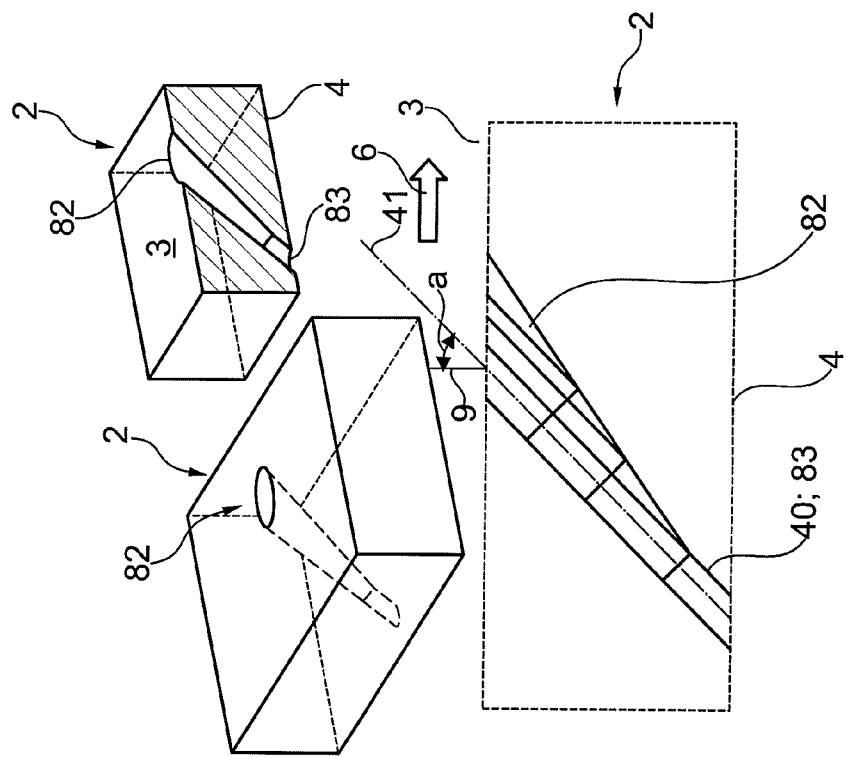
Figure 19:
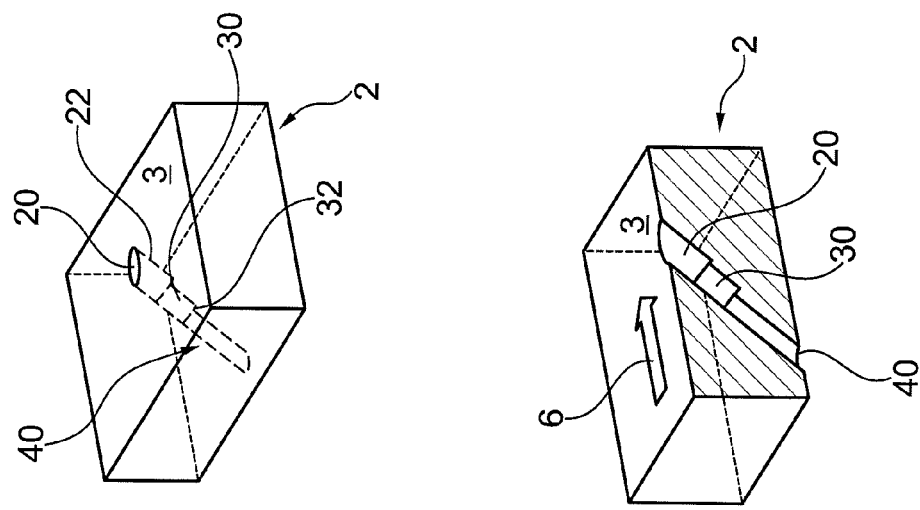

An embodiment of conical cooling holes is shown in FIG. 14. In the lower part of FIG. 14 a wall 2 is shown with a number of cooling holes 8 comprising a conical geometry. The cooling holes are tilted in the intended hot gas flow direction 6. The cooling holes comprise a conical section 82 and a metering section 83. In the upper part of FIG. 8 an axial view of a cooling hole 8 is shown, with a conical section perimeter 84 and a metering section perimeter 85 visible. The centers of the perimeters 84 and 85 are offset from each other. The offset is chosen such that the perimeters are tangent. The metering section is offset from the conical section upstream the intended hot gas flow direction 6.

FIGS. 15 through 20 illustrate a method for manufacturing cooling holes 8 of FIG. 14. The manufacturing steps illustrated in FIGS. 15 through 19 are essentially identical to those shown in FIGS. 9 through 13. As a final manufacturing step, illustrated in FIG. 20, the stepwise transitions between the diameters of the first and second non-penetrating holes and the second non-penetrating hole and the through hole are evened out by a chip removing process, for instance a milling process. In particular a high speed cutting process may be applied. In the lower picture in FIG. 20 the hole 8 is shown in a sectional view. The dashed lines denote the drilled first hole, second hole and through hole. The solid lines show the conical hole. As is seen, the stepwise cross sectional changes present due to the drilling of holes with different diameters have been eliminated by the chip removing final shaping process. Further seen is the through hole axis 41 which is inclined against the surface normal 9 with an angle a in the direction of the intended hot gas flow 6. As is further seen, due to the shape of the conical section 82 of the cooling hole the coolant flow will emanate from the cooling hole even more tangentially oriented to the wall first surface 3.

Figure 21:
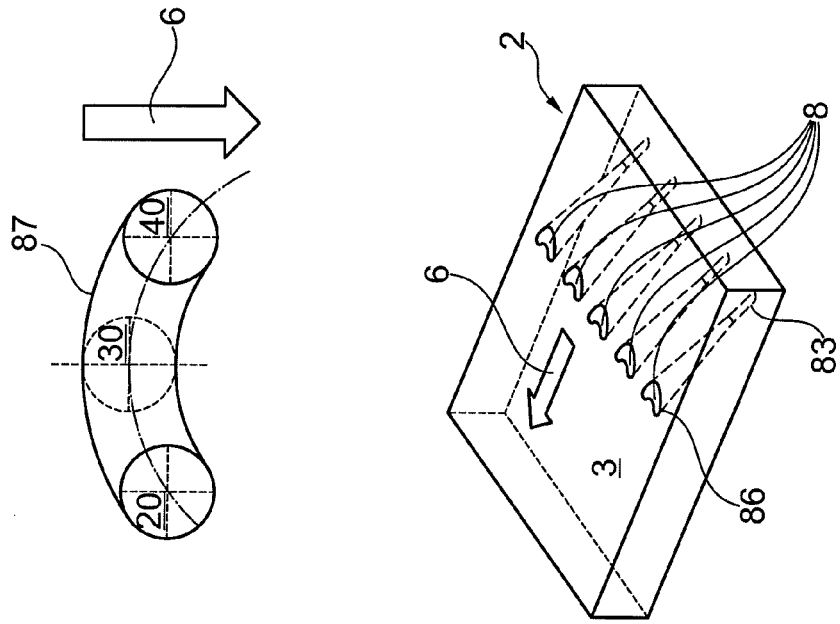
FIGS. 21 and 22 exemplary embodiments of cooling holes comprising fan-shaped sections.
Figure 22:
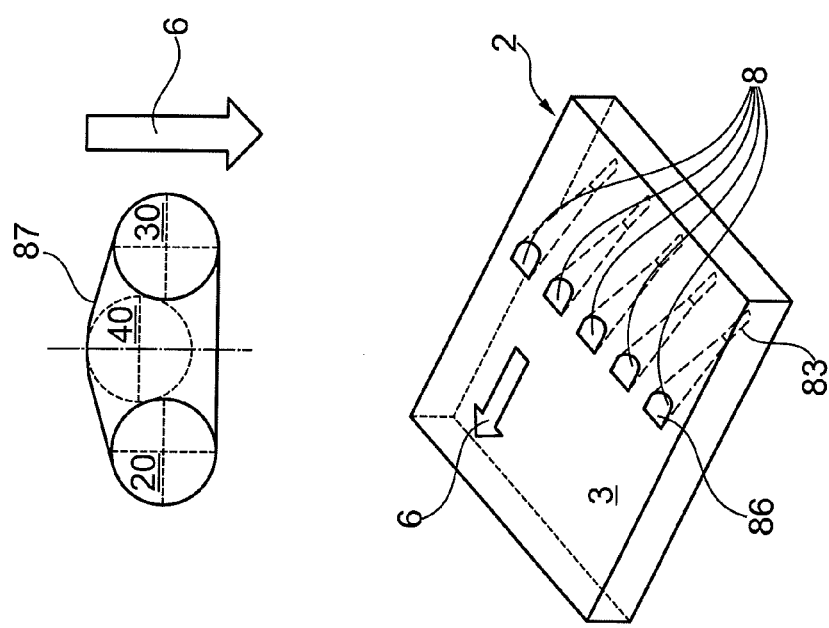
Figure 23:
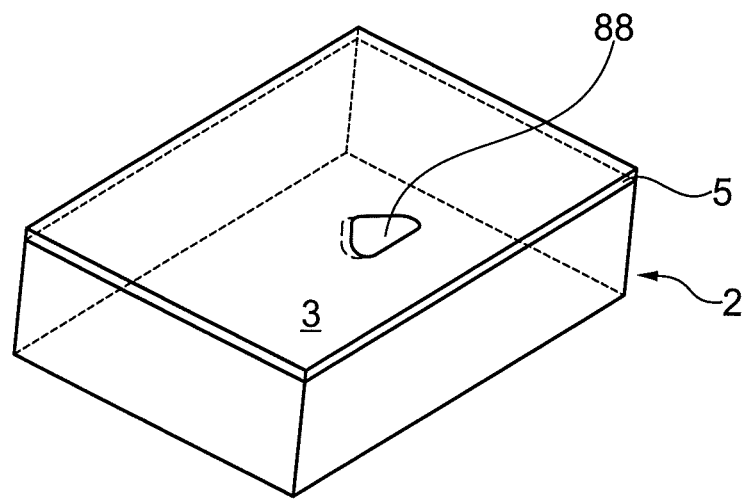
FIGS. 23-28 a method for manufacturing cooling holes according to any of FIGS. 21 and 22.
Figure 23:
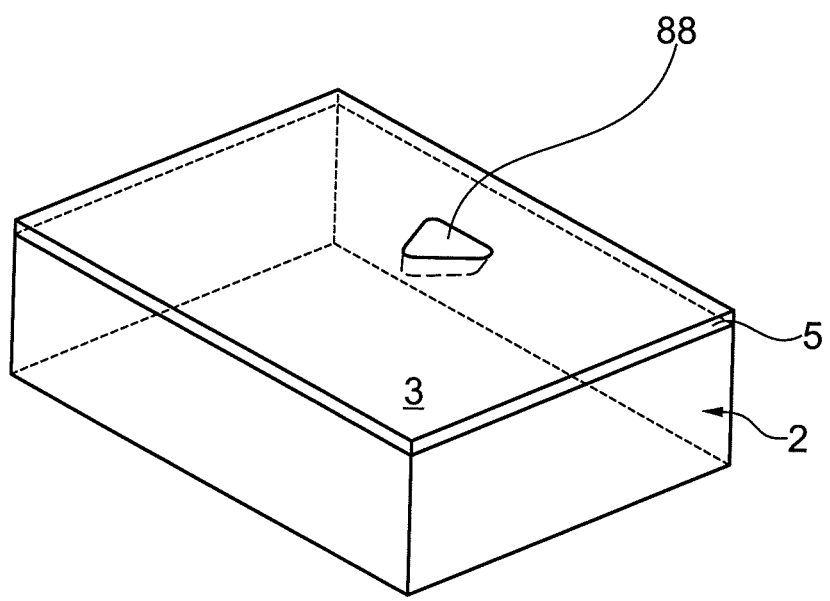
Figure 24:
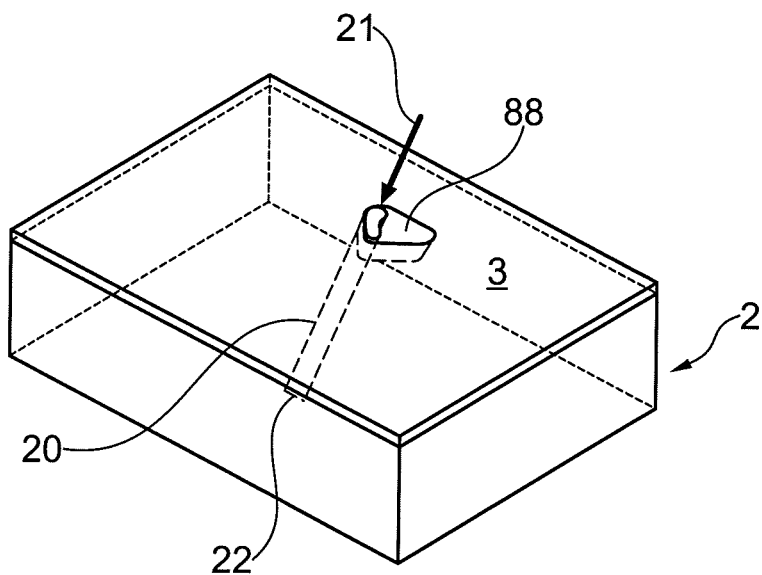
Figure 24:
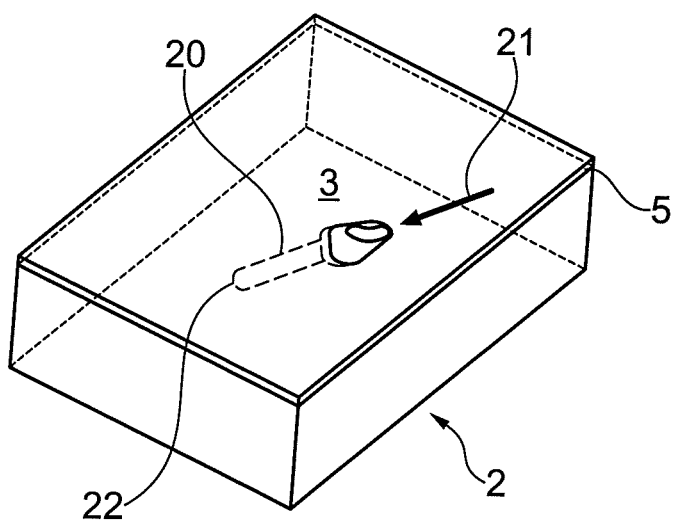
Figure 25:
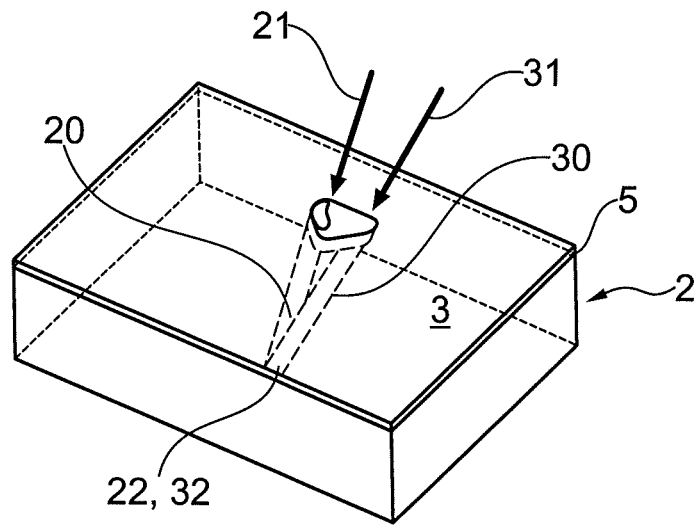
Figure 26:
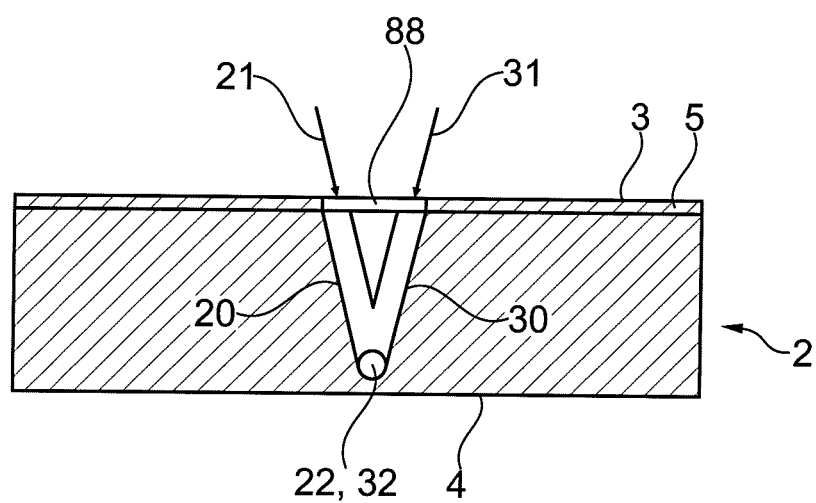
Figure 27:
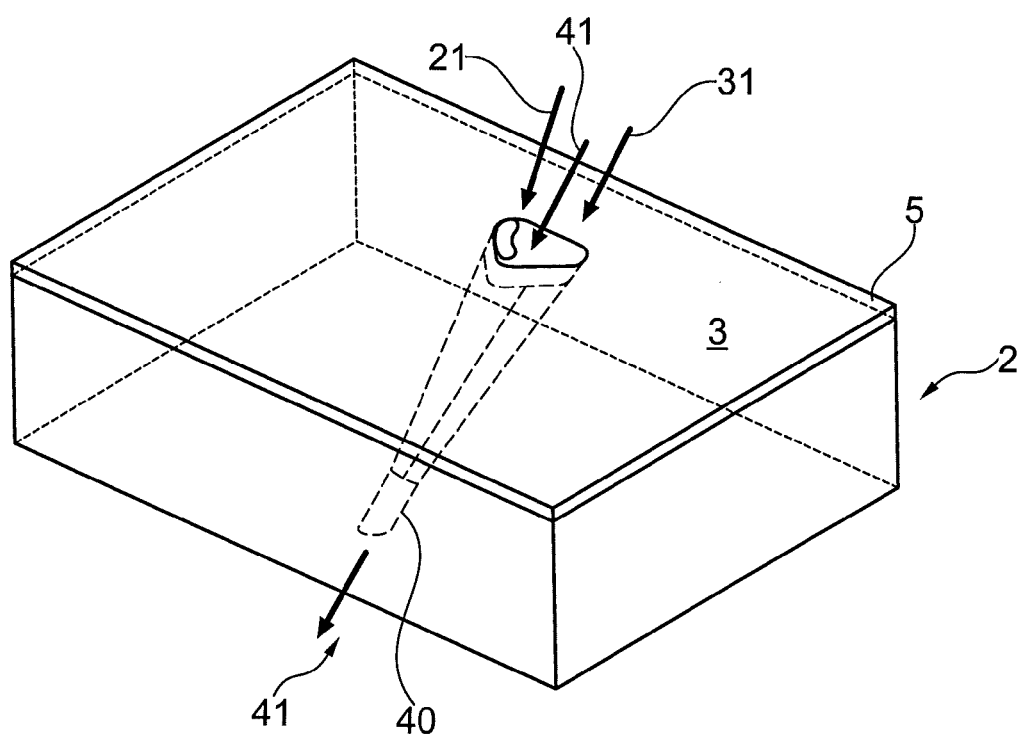
Figure 28:
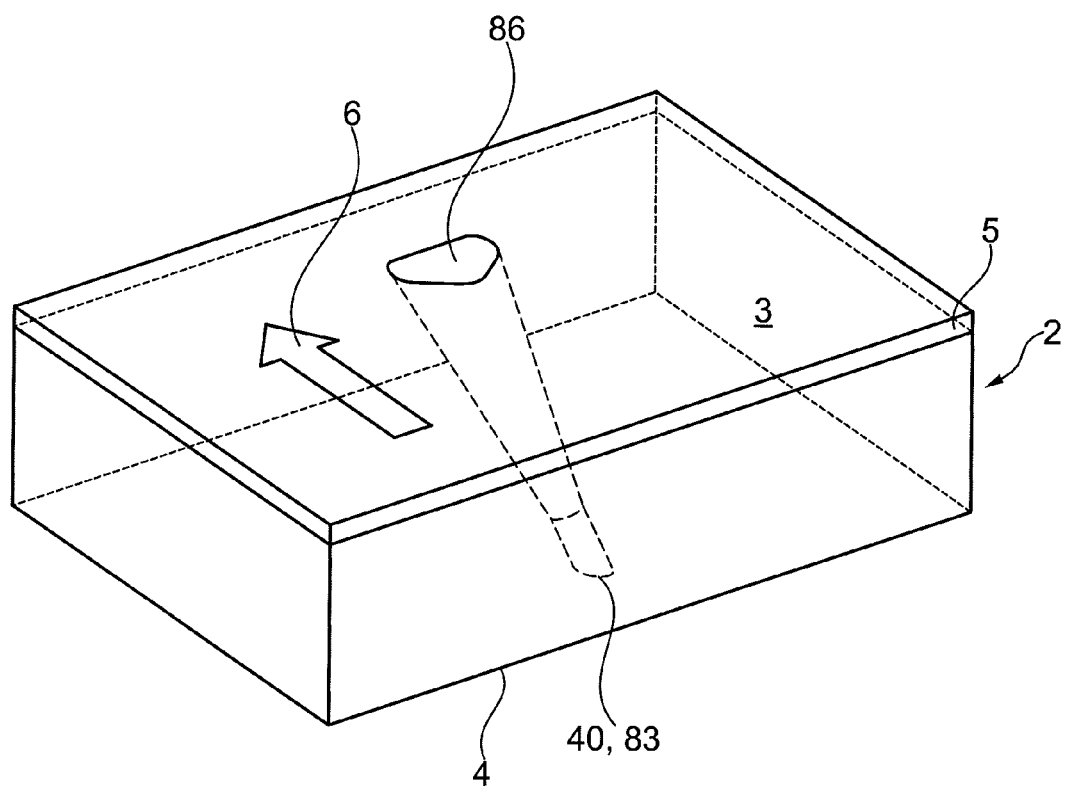

FIGS. 21 and 22 illustrate two embodiments of fan-shaped holes. The cooling holes 8 comprise a fan-shaped section 86 and a metering section 83. The upper parts of FIGS. 21 and 22 illustrate axial views of the cooling holes, with the fan-shaped section perimeter 87, as well as illustrating the first hole 20, the second hole 30, and the through hole 40 which are initially manufactured in the wall 2 starting at the wall first surface 3, as will be lined out in connection with FIGS. 23 through 28. The entry locations of the holes in the wall first surface are chosen such that the entries of the holes in the wall first surface are non-overlapping. FIG. 23 illustrates the initial step of locally removing the thermal barrier coating. Said step may be carried out to manufacture an uncoated area 88 which is essentially identical to the cooling air opening to be manufactured on the wall first surface 3. With reference to FIG. 24, a first non-penetrating hole 20 is drilled along a first hole axis 21, comprising a distal end 22. With reference to FIG. 25, a second non-penetrating hole 30 is drilled along a second hole axis 31. Second hole axis 31 is chosen such as to meet first hole distal end 22 when drilling the second hole 30. The second hole is drilled as deep as to place second hole distal end 32 congruent with first hole distal end 22. As is seen in FIG. 26, a V-shaped hole configuration in wall 2 results. In a next step, shown in FIG. 27, through hole 40 is drilled along through hole axis 41. Through hole axis 41 is chosen such that first and second hole 20, 30 are penetrated at their common distal end, or, at the tip of the "V" shown in FIG. 26. Drilling of through hole 40 is advanced until the wall second surface 4 is penetrated. In a final step residual material between the first, second and through hole is removed by a chip removing, for instance milling, process. The fan shaped hole shown in FIG. 28 results, comprising fan-shaped section 86 and metering section 83, results.

While the method of the present disclosure has now been lined out in the view of exemplary embodiments, it is understood that said exemplary embodiments are in no way intended to limit the scope of the disclosure. Other embodiments whether explicitly mentioned or not, are conceivable and covered under the claims.

LIST OF REFERENCE NUMERALS 1 airfoil
2 wall
3 wall first surface
4 wall second surface
5 thermal barrier coating
6 hot gas flow
7 coolant flow
8 cooling hole
9 surface normal
10 cooling hole axis
11 plane
20 first hole
21 first hole axis
22 first hole distal end or bottom
23 first hole perimeter
30 second hole
31 second hole axis
32 second hole distal end or bottom
33 second hole perimeter
40 through hole
41 through hole axis
43 through hole perimeter
82 conical section
83 metering section 84 conical section perimeter
85 metering section perimeter
86 fan-shaped section
87 fan-shaped section perimeter
88 uncoated area
a tilt angle

The invention claimed is:

1. A method for manufacturing a contoured hole, the hole being manufactured in a wall, the wall comprising a first surface and a second surface, the method comprising:
   manufacturing a first non-penetrating hole extending from the first surface and into the wall, wherein a distal end of the first hole is located within the wall such that the first hole does not penetrate the wall second surface;
   manufacturing a through hole, wherein the through hole is fluidly connected with the first hole and penetrates the second surface of the wall; and
   manufacturing a second non-penetrating hole, the second hole being fluidly connected with the first hole and comprising a second hole distal end located within the wall such that the second hole does not penetrate the second surface of the wall, the second hole being fluidly connected with the through hole.

2. The method according to claim 1, comprising:
   manufacturing the first hole with a first cross sectional area;
   manufacturing the through hole with a through hole cross sectional area; and
   choosing the through hole cross sectional area to be smaller than the first cross sectional area.

3. The method according to claim 1, comprising:
   manufacturing the first hole with a first cross sectional area;
   manufacturing the second hole with a second hole cross sectional area; and
   manufacturing the through hole with a through hole cross sectional area, wherein the through hole cross sectional area is smaller than at least one of the first and second cross sectional areas.

4. The method according to claim 3, wherein the through hole cross sectional area is smaller than both the first and the second cross sectional area.

5. The method according to claim 3, wherein the through hole cross sectional area is smaller than the second cross sectional area and the second cross sectional area is smaller than the first cross sectional area.

6. The method according to claim 1, comprising:
   manufacturing the first hole comprises penetrating the first surface at a first entry location and forming a first entry opening, and advancing a tool into the wall along a first hole axis, and stopping advancing before reaching the wall second surface, thus producing a first hole distal end; and
   manufacturing the second hole comprises penetrating the first surface at a second entry location and forming a second entry opening, and advancing a tool into the wall along a second hole axis, and stopping tool advancement before reaching the wall second surface, thus producing a second hole distal end.

7. The method according to claim 6, comprising:
   arranging the first and second entry openings in a non-overlapping manner.

8. The method according to claim 6, comprising:
   removing material between the first and second hole and the through hole.

9. The method according to claim 6, wherein the manufacturing of the through hole comprises:
   penetrating the first surface at a through hole entry location different from the first and second entry locations and forming a through hole entry opening;
   advancing a tool into the wall along a through hole axis; and
   continuing tool advancement until the wall second surface is penetrated thus producing the through hole.

10. The method according to claim 9, further comprising:
    choosing the through hole axis such as to include a main tilt angle with the wall first surface normal at the through hole entry location and defining a main plane spanned up by the through hole axis and the wall first surface normal at the through hole entry location;
    choosing the first and second hole axes such as to include first and second tilt angles with the wall first surface normal at the respective entry locations, wherein the first and second hole axis, when projected onto the main plane, include first and second projected tilt angles with the surface normal at the through hole entry location; and
    choosing said respective first and second projected tilt angles larger than the main tilt angle.

11. The method according to claim 9, further comprising:
    choosing the through hole axis such as to include a main tilt angle with the wall first surface normal at the through hole entry location and defining a main plane spanned up by the through hole axis and the wall first surface normal at the through hole entry location; and
    choosing the first and second hole entry locations to be laterally offset from the main plane.

12. The method according to claim 11, further comprising:
    choosing the first and second hole entry locations on different sides of the main plane.

13. The method according to claim 9, further comprising:
    choosing the first, second and through hole axis such that each hole intersects with at least one other hole and wherein in particular all three holes intersect at a common intersection location.

14. The method according to claim 13, wherein the through hole intersects the first and second holes at a common first and second hole distal end location.

15. The method according to claim 1, further comprising:
    laterally offsetting at least one of a through hole axis and a second hole axis from and at least essentially parallel to a first hole axis.

16. The method according to claim 15, comprising:
    offsetting the axes such that the hole perimeters are tangent with each other.

17. The method according to claim 15, comprising:
    smoothening the transitions between the holes thus producing a fan-shaped hole with a continuous inner surface.

18. The method according to claim 1, further comprising:
    laterally offsetting a second hole axis from and at least essentially parallel to a first hole axis and laterally offsetting a through hole axis from and at least essentially parallel to the second hole axis.

19. The method according to claim 1, further comprising:
    laterally offsetting a second hole axis from a first hole axis by a first offset;
    laterally offsetting a through hole axis from the second hole axis by a second offset; and
    choosing the first offset and the second offset to be at least essentially aligned with each other.

20. The method according to claim 1, wherein manufacturing a hole comprises drilling.

\* \* \* \* \*